(12) United States Patent
Krzywicki

(10) Patent No.: US 8,691,423 B2
(45) Date of Patent: Apr. 8, 2014

(54) REBUILT RECHARGEABLE BATTERY WITH WELDED GRIP

(76) Inventor: Joseph Krzywicki, Doylestown, PA (US)

( * ) Notice: Subject to any disclaimer, the term of this patent is extended or adjusted under 35 U.S.C. 154(b) by 327 days.

(21) Appl. No.: 13/047,581

(22) Filed: Mar. 14, 2011

(65) Prior Publication Data

US 2012/0237818 A1   Sep. 20, 2012

(51) Int. Cl.
*H01M 10/02* (2006.01)
*H01M 10/04* (2006.01)

(52) U.S. Cl.
USPC ........... 429/159; 429/156; 429/158; 429/160; 29/623.1

(58) Field of Classification Search
USPC ................. 429/156–160; 29/623.1; 439/194
See application file for complete search history.

(56) References Cited

U.S. PATENT DOCUMENTS

| | | | |
|---|---|---|---|
| 1,201,215 A | 10/1916 | Milliken | |
| 1,627,447 A | 5/1927 | Mucher | |
| 2,575,976 A | 11/1951 | Rock | |
| 2,983,899 A | 5/1961 | Amodio | |
| 3,615,867 A * | 10/1971 | Cich et al. | 29/623.1 |
| 4,024,953 A | 5/1977 | Nailor, III | |
| 4,394,059 A | 7/1983 | Reynolds | |
| 4,693,948 A | 9/1987 | McEwan | |
| 5,191,710 A * | 3/1993 | Fujimaki et al. | 29/863 |
| 6,391,489 B1 | 5/2002 | Winch | |
| 7,294,020 B2 | 11/2007 | Zhao | |
| 7,507,124 B2 | 3/2009 | Kim | |
| 7,776,467 B2 | 8/2010 | Kato | |
| 2006/0234558 A1 | 10/2006 | Li | |
| 2008/0152993 A1* | 6/2008 | Seiler et al. | 429/92 |
| 2008/0248383 A1 | 10/2008 | Kim | |
| 2009/0075163 A1 | 3/2009 | Shevock et al. | |

* cited by examiner

*Primary Examiner* — Carlos Barcena
*Assistant Examiner* — Michael Dignan
(74) *Attorney, Agent, or Firm* — Howson & Howson LLP

(57) ABSTRACT

A rechargeable power tool battery is rebuilt by replacing its spent cells with an array of replacement cells in which connections are made by conductive connectors, ends of which are clamped by bent-over arms of star-shaped malleable metal grips, the hubs of which are spot welded to cell terminals by the replacement cell supplier. Replacement cells can be supplied in pairs with the positive terminal of one cell of the pair permanently connected to the negative terminal of the other cell of the pair and with the other positive and negative terminals each provided with a spot-welded star-shaped grip.

16 Claims, 9 Drawing Sheets

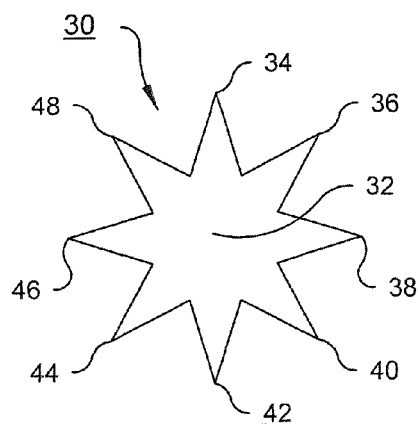
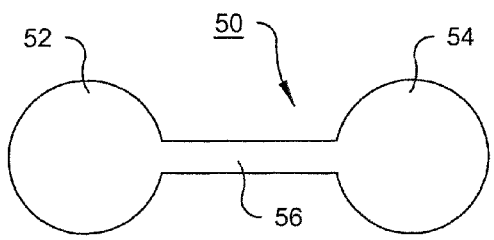
Fig. 1
Fig. 2
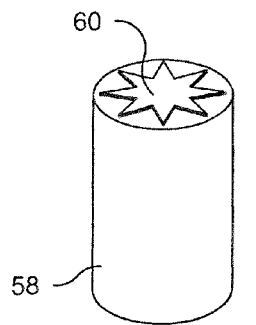
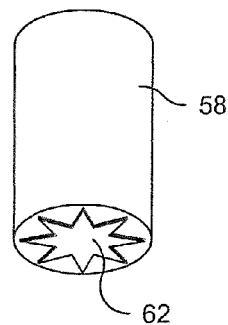
Fig. 3
Fig. 4
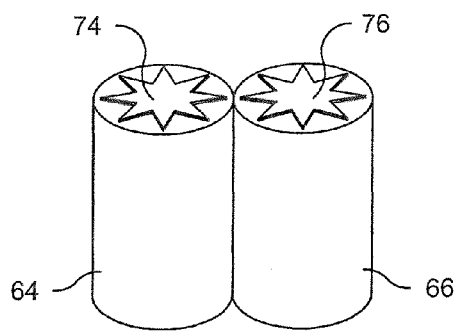
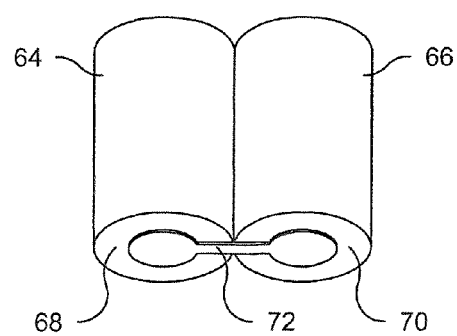
Fig. 5
Fig. 6

REBUILT RECHARGEABLE BATTERY WITH WELDED GRIP

FIELD OF THE INVENTION

This invention relates to batteries, and more particularly to the rebuilding of rechargeable batteries of the kind used in power tools such cordless drills, saws, vacuum cleaner and the like, as well as in cordless lighting devices, radio-controlled model automobiles, and numerous other devices.

BACKGROUND OF THE INVENTION

A rechargeable battery typically has a useful life between approximately three hundred and one thousand charging cycles. Eventually, due to chemical changes in the electrochemical cells making up the battery, they no longer hold their charge, and require replacement.

Conventionally, when a rechargeable battery reaches the end of its life, the user purchases a new one, or sends the spent battery to a rebuilder, who will install new cells and spot-weld connectors to them using industry-specific welding equipment. Both conventional solutions are costly, and the latter solution, professional rebuilding, is also time-consuming, and puts the cordless tool out of service for the time required for rebuilding, unless the user maintains a spare battery.

There are numerous different kinds of rechargeable batteries for cordless tools, and these batteries having varying numbers of cells and a variety of different cell arrangements. Because of the variety of batteries, it is impractical for anyone to supply replacement kits consisting of replacement cells with their electrical interconnections already made.

A user can obtain individual replacement cells, but the expensive specialized welding equipment needed for battery rebuilding is beyond the means of most ordinary users. On the other hand, an attempt to solder connections to the replacement cells, will often overheat the replacement cells and ruin them. In the case of attempts to solder connections to lithium ion (Li ion) cells, there is a significant risk of explosion and personal injury.

SUMMARY OF THE INVENTION

This invention addresses the above-described problems by means of an inexpensive kit containing a plurality of new rechargeable cells, which can be assembled in any of a wide variety of cell configurations. The kit also includes connectors which can be used to interconnect the cells and to connect the array of cells to output terminals without the need for welding or soldering. Using the kit, a user can produce a replacement battery by removing the spent cells from the battery case, assembling replacement cells in the same configuration as that of the spent cells, making electrical interconnections, placing the interconnected cells into the battery case, and making final connections to the battery terminals. These steps can be carried out easily and without the need for special skills.

In a preferred embodiment, a key to the solution to the problem of making interconnections in the array of cells is the use of "star"-shaped metal grips welded to cell terminals, and conductive connectors having enlarged ends which can be clamped to the star-shaped grips by bending radial arms of the stars over the connector ends. Each of the conductive connectors is preferably a unitary strip of sheet metal.

To rebuild most batteries in which the cells are connected in series, it is possible to supply cells in pairs, each pair consisting of two side-by-side, oppositely oriented, cells with a positive terminal of one cell of the pair already connected to a negative terminal of another cell of the pair, and with star grips welded to the other two terminals.

In some battery packs that include an array of cylindrical cells in side-by-side relationship, one or more connections will be made at the top of an array, and one or more connections will be made at the bottom of the array. In some cases, these connections will be made directly to battery pack terminals. In others, a connection will be made from the top or bottom of a cell in the side-by-side array to one or more additional cells disposed in a "crown," i.e., a part of the battery pack that extends upward from the part in which the side-by-side array is enclosed. The crown is typically designed to fit removably into a similarly shaped receptacle of a power tool, and includes the battery terminals through which current is delivered to the tool.

To enable rebuilding of battery packs having side-by-side arrays of cells, in which connections must be made both to the top and to the bottom of the side-by-side array, a replacement kit may include not only pre-connected pairs of cells, but one or more individual cells having star-shaped grips at both ends. Preferably, a replacement kit should include three such individual cells.

Some rechargeable batteries, such as those using lithium ion (Li ion) cells are composed of series connected units, each unit being composed of two cells electrically connected in parallel. In such a case, star grips can be used as in the above-mentioned series-connected battery, but are interconnected by metal connectors each having four star grip-engaging parts.

The rebuilt rechargeable battery in accordance with the invention comprising a battery case and a plurality of electrochemical cells within the battery case. The cells are of substantially uniform size, each having a cylindrical shell, a positive terminal at one end of the shell, and a negative terminal at an opposite end of the shell. The cells are arranged in an array in which the cylindrical shell of each cell is in close proximity to the cylindrical shell of at least one other cell in the array, and in which a first set of ends composed of one end of each of the shells is disposed substantially in a first plane and the remaining ends of the shells are disposed substantially in a second plane parallel to the first plane and spaced from the first plane by a distance substantially equal to the length of each of the shells.

The cells are interconnected electrically by a plurality of electrical connections, each being from a terminal of one cell to a terminal of another cell. Each connection comprises first and second star-shaped grips. Each grip is composed of sheet metal and has a hub and a plurality of arms extending from the hub. The hub of the first grip is welded to a terminal of one cell, and the hub of the second grip is welded to a terminal of another cell. A conductive connector connecting the first and second grips has a first part engaged with the hub of the first grip and a second part engaged with the hub of the second grip. The arms of each grip initially extend radially outward from the hub. When the conductive connector is in place, with its first and second parts in engagement with the hubs, a plurality of arms of the first grip is bent over the first part of the connector, clamping the first part against the hub of the first grip, and a plurality of arms of the second grip is bent over the second part, clamping the second part against the hub of the second grip.

In embodiments in which the conductive connector only connects a terminal of one cell to a terminal of another cell, the connector preferably includes an elongated intermediate part connecting its first and second parts thereof, and the intermediate part is narrower than each of the first and second parts in a direction parallel to the planes in which the ends of the shells are disposed and perpendicular to its direction of elongation. Although the connector can consist of two disc-shaped parts connected by a wire, as mentioned previously, the preferred connector is a dumbbell-shaped unitary strip composed of two disc-shaped end parts connected by a narrow connecting part.

In a preferred embodiment, in which each of the first and second parts of the conductive connector is circular in shape, each of the first and second parts has a diameter larger than the diameter of the grip hub against which it is clamped.

To prevent the circular part of a conductive connector from sliding out of the star-shaped grip with which it is engaged, the bends of at least three arms of the grip bent over the circular part contact the periphery of the circular part at corners of a triangle within which the center of the circular part is located.

In the case of a battery composed of series-connected cells, the cells can be supplied in a rebuilding kit in pairs of side-by-side cells, with terminals at one end of the pair of cells directly welded to a conductive connector. One or more solitary additional cells having star-shaped connectors at both ends may also be provided in the rebuilding kit. The pairs of cells can be assembled into the desired array with the direct welded connections in a plane in which one end of each cell is situated. Connections can then be made from one star-shaped grip to another in a plane in which the other ends of the cells are situated. The solitary cells allow for connections to the bottom of the array where needed to duplicate the original battery connections.

The star-shaped arms allow connections from one grip to another in any configuration of the cell array. Since one cylindrical cell can be surrounded by six more similar cylindrical cells, all touching the one cell, it is possible to utilize star-shaped grips having six arms uniformly spaced around the hub, and to bend five of the arms over a disc-shaped end of a conductive connector and to position the intermediate portion, i.e., the bridge portion, of the connector over the remaining unbent arm of the grip. In such an arrangement, the intermediate portion of the connector can be made to extend to any adjacent cell by leaving only one arm of the grip unbent.

Although each of the star-shaped grips can have as few as three arms, it is preferred that each star-shaped grip have at least five arms, and still more preferable that each star-shaped grip have eight arms. When one or more of the arms is not bent over a hub-engaging part of the connecting strip, space is allowed for the intermediate part of the connecting strip to extend from the grip to another grip, overlying the arm or arms that are not bent over the hub-engaging part of the connecting strip.

The arms of the star-shaped grips can have any of various shapes. For example, each arms can be in the form of an elongated rectangle. Preferably, however, each arm is triangular in shape.

Another aspect of the invention is a method for rebuilding a rechargeable battery. A battery which can be rebuilt by the method comprises a set of spent, electrically interconnected, electrochemical cells of substantially uniform size within a battery case. The cells are connected either directly, or through one or more additional cells, to battery terminals on the battery case. Each of the cells has a cylindrical shell, a positive terminal at one end of the shell, and a negative terminal at an opposite end of the shell. The cells of the set are arranged in an array in which the cylindrical shell of each cell is in close proximity to the cylindrical shell of at least one other cell in the array, and a first set of ends composed of one end of each of the shells is disposed substantially in a first plane and the remaining ends of the shells are disposed substantially in a second plane parallel to the first plane and spaced from the first plane by a distance substantially equal to the length of each of the shells.

The method comprising a set of steps, which can be, but are not necessarily, carried out in the following sequence. The first step is the removal of the spent cells from the battery case. A fresh set of cells is then arranged in substantially the same arrangement as that of the spent cells. Metal grips are permanently connected, preferably factory-welded, to terminals of the fresh set of cells, so the cells are supplied to the rebuilder with grips already welded to them. Electrical interconnections, corresponding to the electrical interconnections in the set of spent cells, are established in the fresh set of cells. These electrical interconnections are established at least in part by connecting grips to one another by mechanically securing first and second parts of a conductive connector to the grips to be connected. Insulating paper, referred to as "fish paper," may be cut to size and positioned against the top and bottom planes of the cells to prevent short circuiting caused by contact of the cell terminals or their connectors with wires or metal objects within the battery case. The interconnected fresh set of cells is then enclosed in the battery case, and electrical connections are made from the fresh set of cells, either directly, or through additional cells apart form the array, to the battery terminals on the battery case.

Preferably, the grips are star-shaped grips having hubs, and the grips are secured to the conductive connectors by positioning first and second parts of the connectors in contact with hubs of grips to be connected, and bending arms of the grips over the first and second parts of the connector, thereby clamping the first and second parts of the connector to the hubs of the grips.

Rebuilding a rechargeable battery in accordance with the invention has a number of advantages. Rebuilding can be carried out quickly and inexpensively by the user without the risk of damage to replacement cells by heat. The star-shaped grips produce reliable interconnections. The same rebuilding kit can be used to rebuild a wide variety of batteries. In addition, the rebuilding kit is environmentally advantageous in that it allows for reuse of the battery case so that the battery case does not need to be thrown away, and in that the separation of the spent cells from the battery case in the rebuilding process encourages recycling of spent cells. Further objects and advantages of the invention will be apparent from the following description when read in conjunction with the drawings.

BRIEF DESCRIPTION OF THE DRAWINGS

FIG. 1 is a plan view of a star-shaped grip in accordance with the invention;

FIG. 2 is a plan view of a conductive connector having enlarged, circular, grip hub-engaging ends connected by a narrow intermediate part;

FIG. 3 is a perspective view of a single replacement cell showing a star-shaped grip spot-welded to its upper terminal;

FIG. 4 is another perspective view of the single replacement cell of FIG. 3, showing the star-shaped grip spot-welded to its lower terminal;

FIG. 5 is a perspective view of a permanently connected cell pair having star-shaped grips welded to the upper terminals of the cells;

FIG. 6 is a perspective view of the cell pair of FIG. 5 showing the permanent connection between the lower terminals;

DETAILED DESCRIPTION OF THE PREFERRED EMBODIMENTS

The star-shaped grip 30 of FIG. 1 comprises a hub 32 and a set of eight triangular arms 34-48 extending radially from the hub and disposed uniformly around the perimeter of the hub. The outer ends of the arms are pointed, and the inner ends of the arms meet at eight points uniformly spaced at 45 degree intervals on the perimeter of an imaginary circle defining the hub diameter. The hub diameter is preferably less than the diameter of a replacement cell, which is usually 2.2 cm. The diameter of a circle circumscribing the star with its arms extended can be greater than the cell diameter. The grip can be composed of any of various metals, but should exhibit good electrical conductivity, malleability, and resistance to corrosion. Nickel and various nickel alloys are examples of suitable materials.

Figure 7:
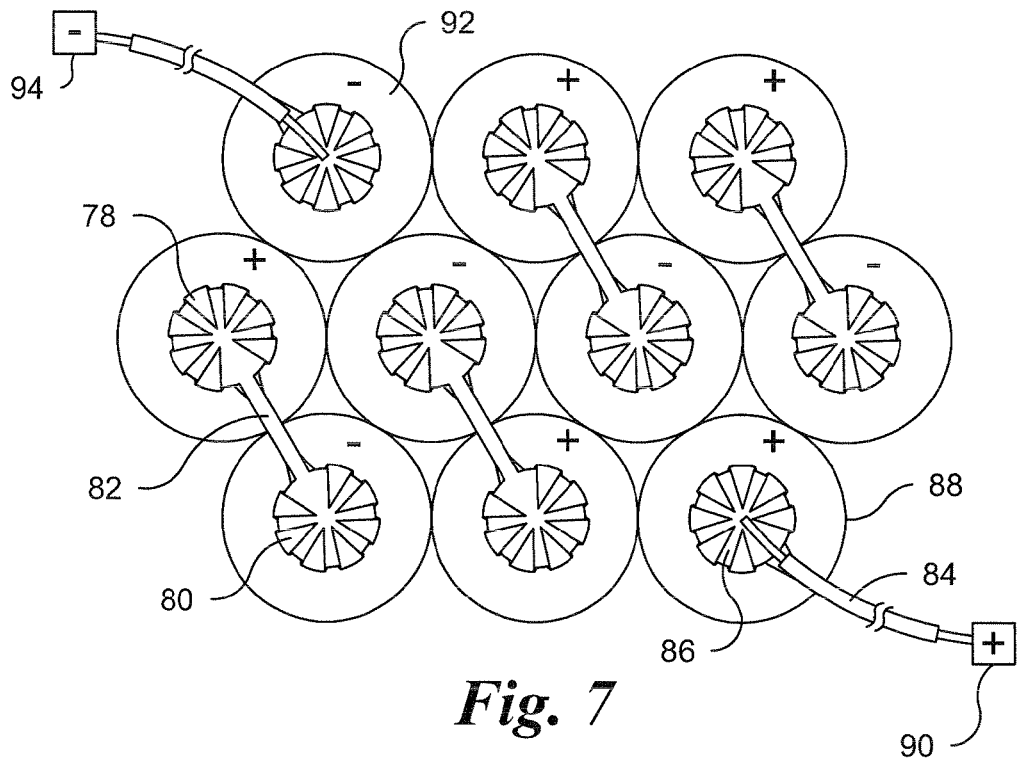
FIG. 7 is a top plan view of an array of replacement cells in which the terminals on the top of the array are interconnected by star-shaped grips and connecting strips.

The conductive connector 50 in FIG. 2, which can also be composed of nickel, a nickel alloy, or another suitable metal, is a sheet metal strip comprising an two circular parts 52 and 54 at opposite ends of an narrower intermediate part, or bridge, 56. The circular parts of the connecting strip can be held by bent-over arms of star-shaped elements on two adjacent cells, as shown in FIG. 7. The diameter of each of the circular parts 52 and 54 of the connecting strip is comparable to the diameter of the hub 32 of the star-shaped grip 30. Preferably, the diameter of the circular parts 52 and 54 of the connecting strip approximately equal to, or slightly greater than, the diameter of the hub 32, so that the arms of a star-shaped grip can embrace the edges of the circular part when they are bent around it. The distance from the center of part 52 to the center of part 54 is preferably approximately equal to the diameter of a replacement cell so that the parts 52 and 54 can be centered on the star-shaped elements of two adjacent, mutually contacting, cells.

As shown in FIGS. 3 and 4, a solitary cylindrical replacement cell 58 has a star-shaped grip 60 connected to a terminal at one end and another star-shaped grip 62 connected to a terminal at its opposite end. The star shaped grips are connected to the terminals by spot welding the hubs to the terminals. Spot welding the grips to the cells is carried out at a factory, using industry-specific spot welding equipment. The cells will be supplied to the consumer in rebuilding kits with the star-shaped grips pre-welded to the cells.

Replacement cell 58 can be disposed along with a number of similar cylindrical replacement cells in an array in which the cells are in side-by-side relationship with one another, and with their terminals in two parallel planes spaced from each other by the length of a cell. Each cell in the array has at least one oppositely oriented cell adjacent to it. In that array, the cells can be electrically connected in series by connecting positive terminals to negative terminals in both planes.

For most series-connected replacement cell arrays it is possible to utilize pairs of cells in which the positive terminal of one cell of the pair is permanently connected to the negative terminal of the other cell by directly welding a conductive connector to those terminals. FIGS. 5 and 6 illustrate such a pair of cells 64 and 66, in which the positive terminal 68 of cell 64 is directly connected to the negative terminal 70 of cell 66 by a conductive connector 72, spot-welded to terminals 68 and 70. A star-shaped grip 74 is spot-welded to the negative terminal of cell 64, and star-shaped grip 76 is spot-welded to the positive terminal of cell 66. A replacement battery can include a plurality of similar pairs of cells in which the interconnections composed of star-shaped grips and conductive connectors are all on one side, e.g., the top, of the array.

Figure 8:
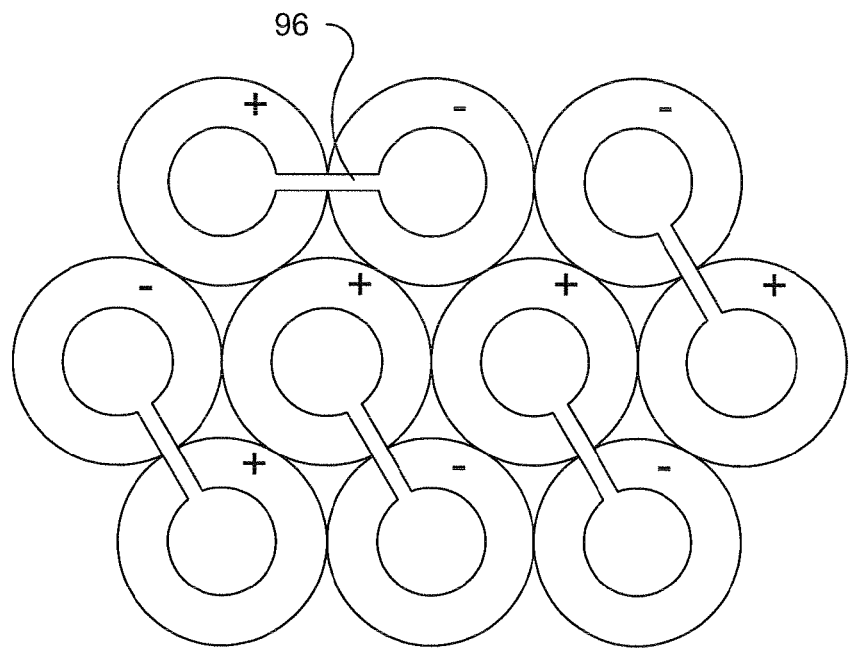
FIG. 8 is a bottom plan view of the array of replacement cells in FIG. 7, showing permanent welded interconnections between the cells of cell pairs at the bottom of the array.

FIGS. 7 and 8 illustrate an array composed of a plurality of pairs of cells in which terminals of the cells of each pair are permanently connected by a strip as shown in FIG. 6. In this array, ten 1.2 volt NiCd (nickel-cadmium) cells are connected in series to form a 12 volt power tool battery. The interconnections in the top plane are made by star-shaped grips and strip connectors, e.g., star grips 78 and 80 and strip connector 82. One end of wire 84 is suitably pre-connected, for example by soldering or crimping, to a disc 86. The disc is secured to a star grip welded to the positive terminal of cell 88. The other end of wire 84 is connected to a positive battery terminal 90. A similar connection is made from the negative terminal of cell 92 to a negative battery terminal 94.

As shown in FIG. 8, the connections in the bottom plane are permanent connections made by welding metal connecting strips, e.g., strip 96, directly to cell terminals. The pairs of cells are provided to the consumer with their permanent connections already made in a factory, using industry-specific spot-welding equipment.

Pairs of cells as shown in FIGS. 5 and 6 can be arranged in any of a variety of arrays, examples of which are depicted in FIGS. 9-20.

Figure 9:
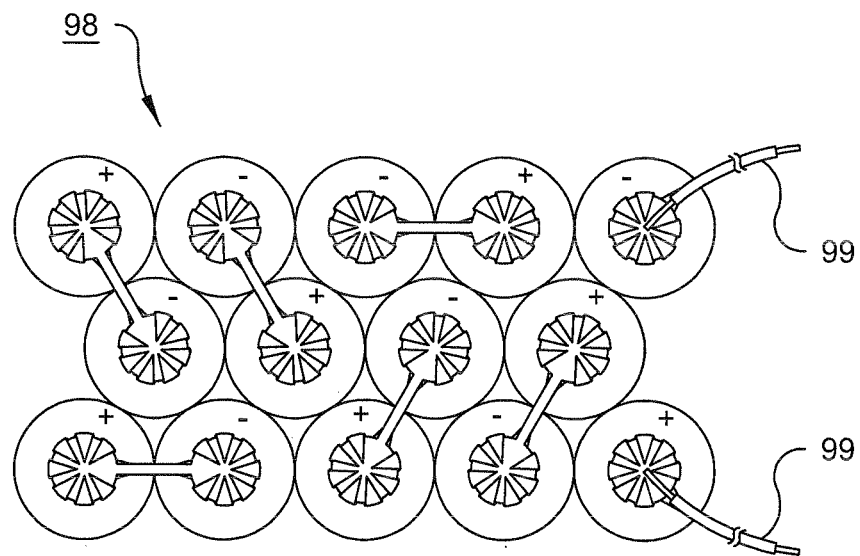
FIG. 9 is a top plan view of another array of replacement cells in which the terminals on the top of the array are interconnected by star-shaped grips and connecting strips.
Figure 10:
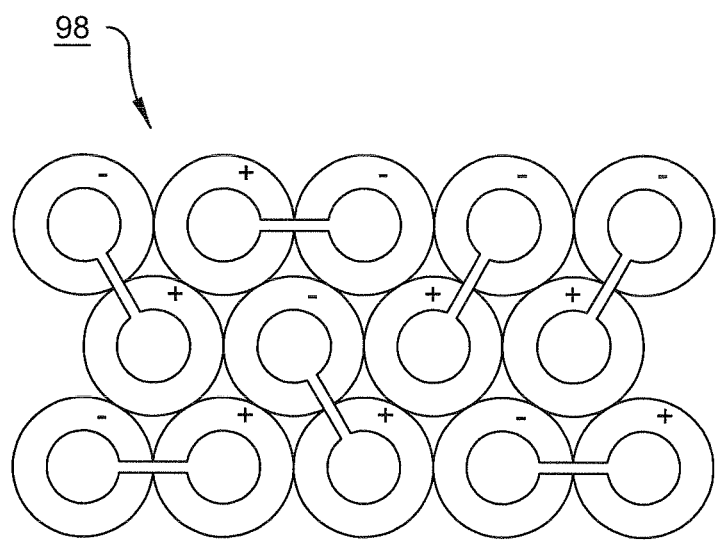
FIG. 10 is a bottom plan view of the array of replacement cells in FIG. 9, showing permanent welded interconnections between the cells of cell pairs at the bottom of the array.

In FIGS. 9 and 10, array 98 is composed of fourteen series-connected cells, which can be connected by leads 99 to a crown containing still another cell (not shown), to form an 18 volt battery pack. In this case, both leads are connected to terminals on the top of the side-by-side array.

Figure 11:
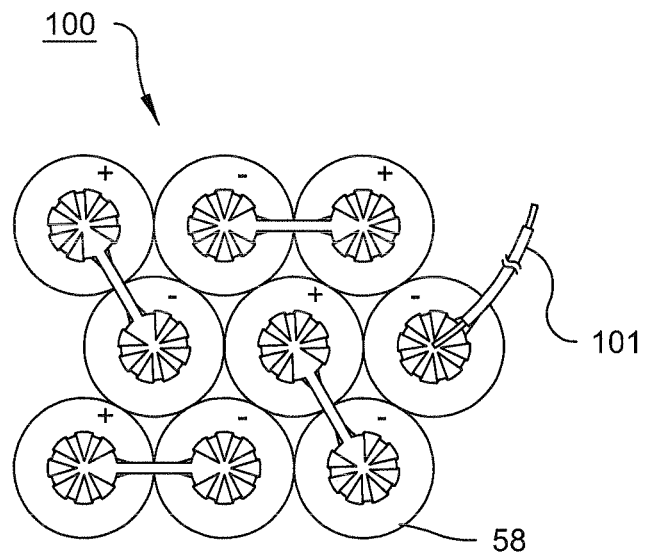
FIG. 11 is a top plan view of still another array composed of an odd number of replacement cells, in which terminals on the top of the array are interconnected by star-shaped grips and connecting strips and in which a terminal of one cell has a star-shaped grip connected to a disc at the end of a connecting wire.
Figure 12:
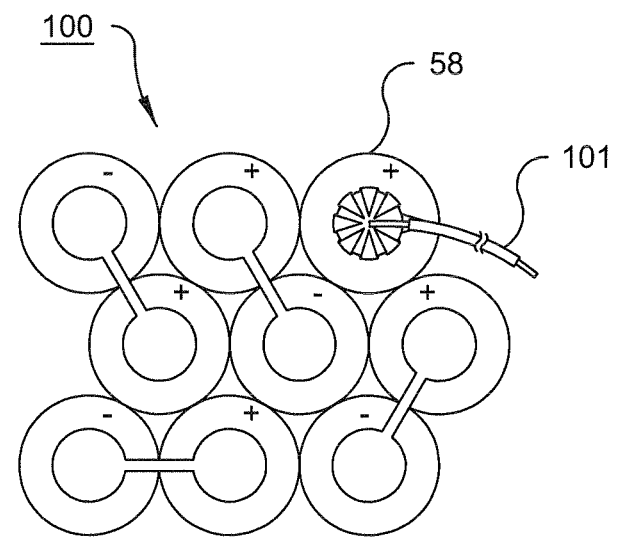
FIG. 12 is a bottom plan view of the array of replacement cells in FIG. 11, showing permanent welded interconnections between the cells of cell pairs at the bottom of the array, and in which a terminal of one cell, which is not part of a permanently connected pair, has a star-shaped grip connected to a disc at the end of a connecting wire.

In FIGS. 11 and 12, array 100 is composed of nine series-connected cells. A terminal at one end of the series, on the top of the array, is connected to one of leads 101, and the terminal at the other end of the series is connected at the bottom of the array to another lead 101. The two leads 101 are connected to a crown containing still another cell (not shown) to provide a 12 volt battery pack. Array 100 is composed of four pre-connected pairs of cells, and one additional cell 58 having star-shaped connectors at both ends.

Figure 13:
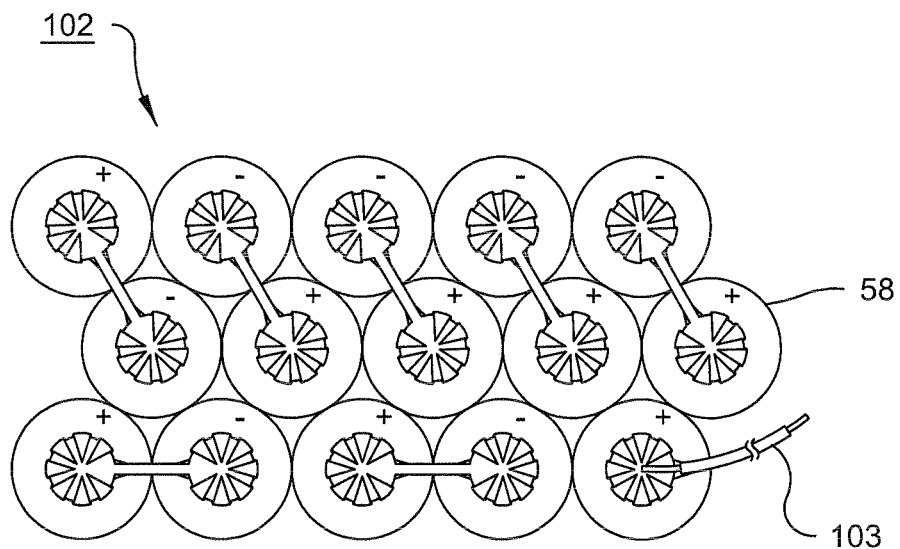
FIG. 13 is a top plan view of still another array composed of an odd number of replacement cells.
Figure 14:
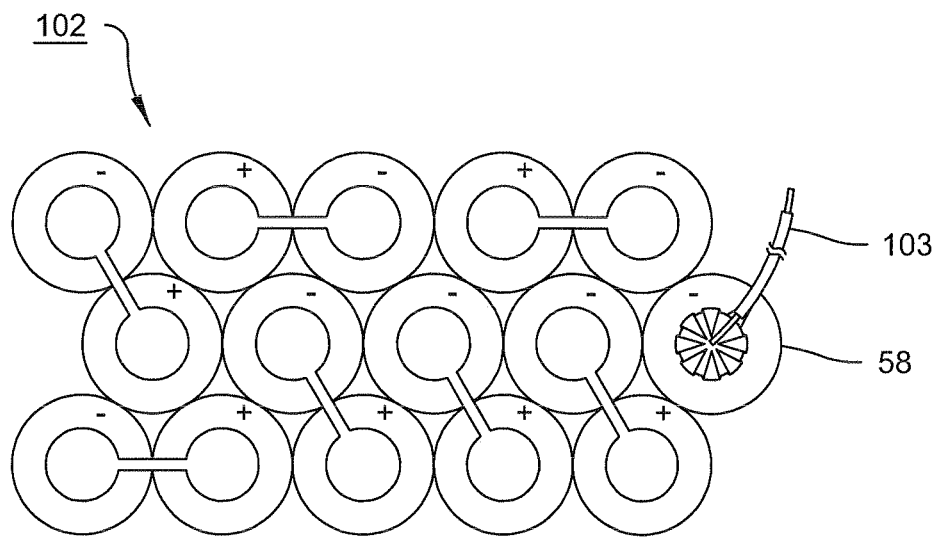
FIG. 14 is a bottom plan view of the array of replacement cells in FIG. 13.

FIGS. 13 and 14 show an array 102 composed of fifteen series-connected cells. A terminal at one end of the series, on the top of the array, is connected to one of leads 103, and the terminal at the other end of the series is connected at the bottom of the array to another lead 103. The two leads 103 are connected to a crown containing still another cell (not shown) to provide a 19.2 volt battery pack. Array 102 is composed of seven pre-connected pairs of cells, and one additional cell 58 having star-shaped connectors at both ends.

Figure 15:
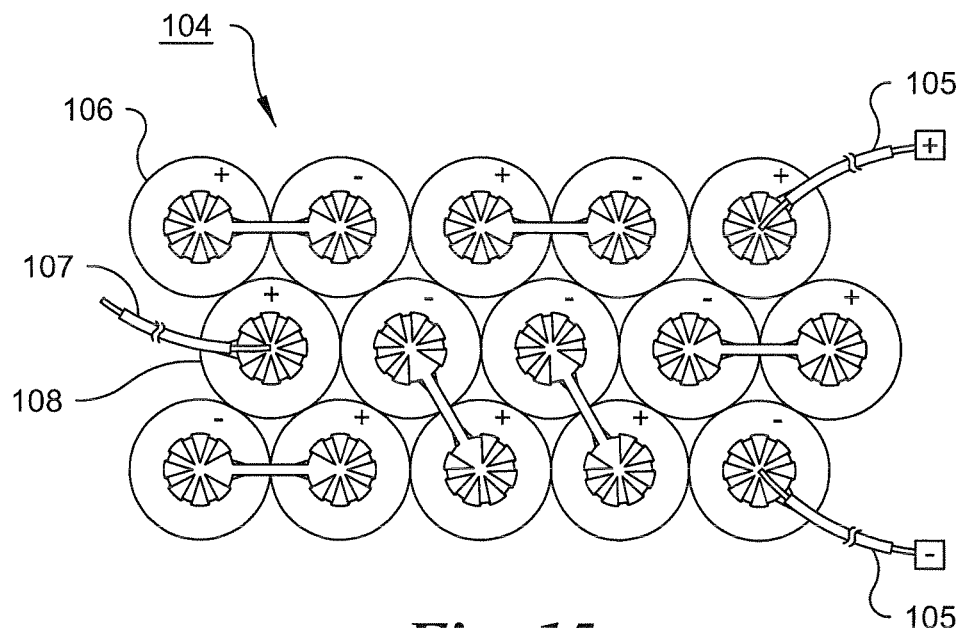
FIG. 15 is a top plan view of still another array composed of an odd number of replacement cells, in which terminals on the top of the array are interconnected by star-shaped grips and connecting strips, and in which a terminal at one end of one of the cells is connected by a wire to a terminal at the opposite end of an adjacent cell.
Figure 16:
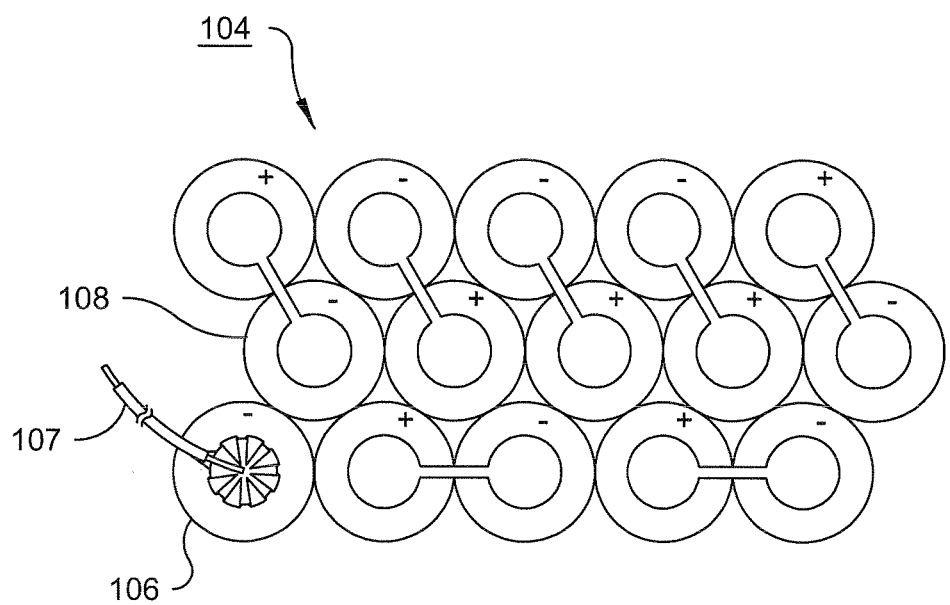
FIG. 16 is a bottom plan view of the array of replacement cells in FIG. 15, showing permanent welded interconnections between the cells of cell pairs at the bottom of the array, and also showing the wire connection.

FIGS. 15 and 16 show an array 104 composed of fifteen series-connected cells, the terminals at opposite ends of the series are both on the top side of the array and are connected by leads 105 to positive and negative battery terminals. The array is composed of seven pre-connected pairs of cells and one solitary cell 106 having star-shaped grips at both ends. A lead 107 at the bottom side terminal of cell 106 is connected to a top side terminal of cell 108, which is one of a pre-connected pair. This battery pack, which consists of a total of fifteen cells, delivers 18 volts.

Figure 17:
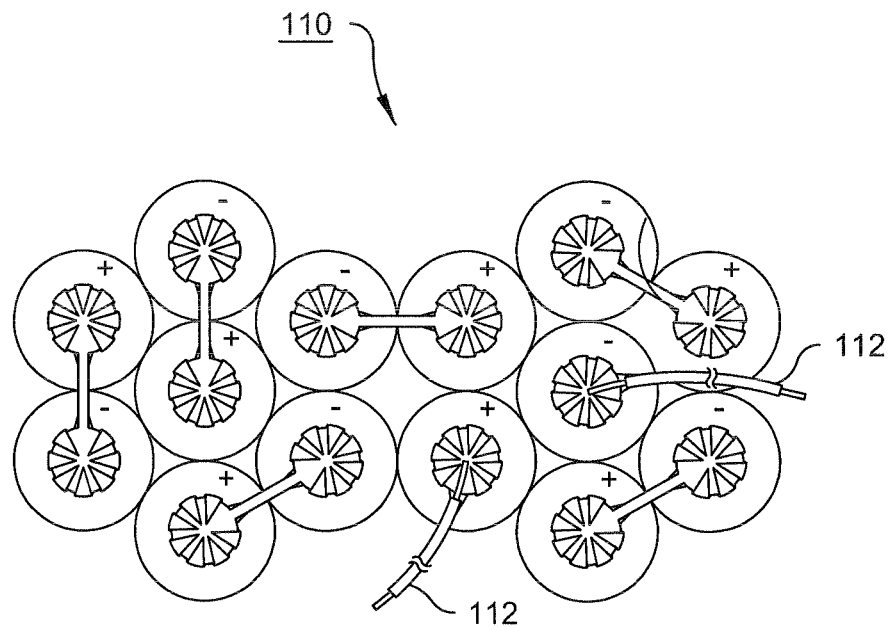
FIG. 17 is a top plan view of still another array of replacement cells in which terminals on the top of the array are interconnected by star-shaped grips and connecting strips.
Figure 18:
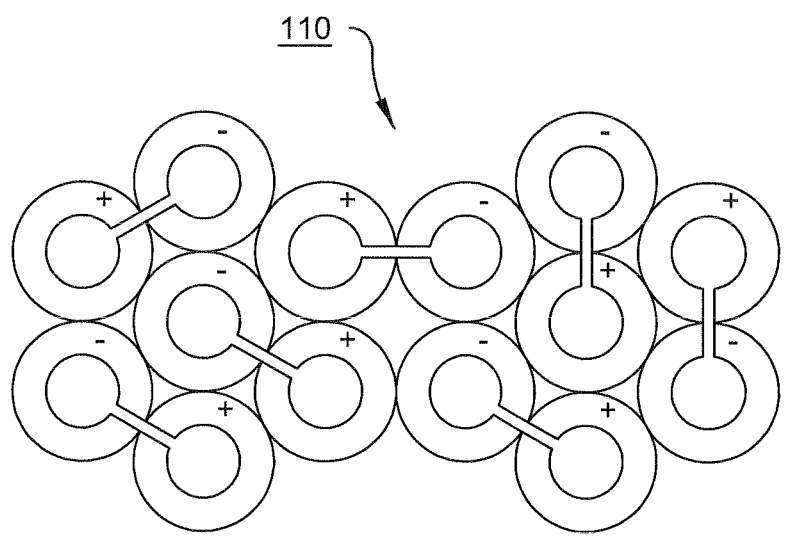
FIG. 18 is a bottom plan view of the array of replacement cells in FIG. 17, showing permanent welded interconnections between the cells of cell pairs at the bottom of the array.

FIGS. 17 and 18 show another array 110 composed of seven pre-connected pairs of cells connected electrically in series. Leads 112, which are both connected to star-shaped grips on the top side of the array, are connected to a crown (not shown) having still another cell, in order to produce an 18 volt battery pack.

Figure 19:
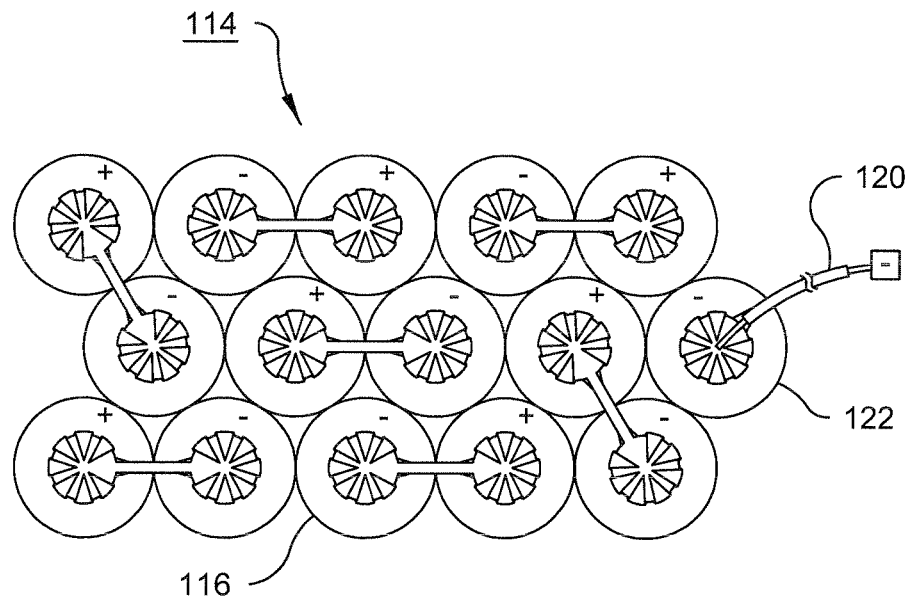
FIG. 19 is a top plan view of still another array of replacement cells in which terminals on the top of the array are interconnected by star-shaped grips and connecting strips, and in which a terminal of one of he cells is connected to a battery terminal by a wire.
Figure 20:
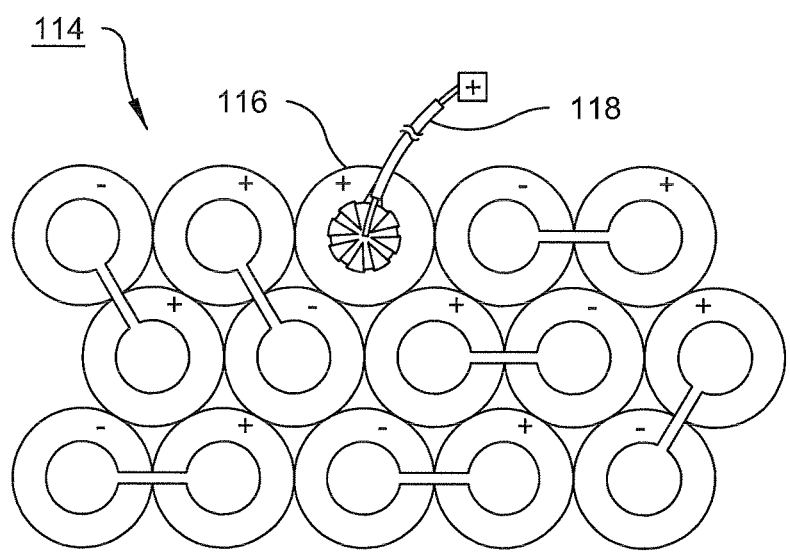
FIG. 20 is a bottom plan view of the array of replacement cells in FIG. 19, showing permanent welded interconnections between the cells of cell pairs at the bottom of the array and in which a bottom terminal of one of the cells is connected to a battery terminal by a wire.

FIGS. 19 and 20 show still another series-connected array composed of seven pre-connected pairs of cells and one solitary cell 116 having star-shaped grips at both of its ends. The positive terminal of cell 116 is at one end of the series. A lead 118 is connected from the positive terminal of cell 116 to a positive battery terminal and a lead 120 is connected from the negative terminal of a cell 122 at the opposite end of the series to a negative battery terminal.

The examples in FIGS. 7-20 represent replacement cell arrays for representative rechargeable NiCd power tool batteries currently being sold. In each case, individual NiCd cells are connected in series from a positive battery terminal to a negative battery terminal.

Figure 21:
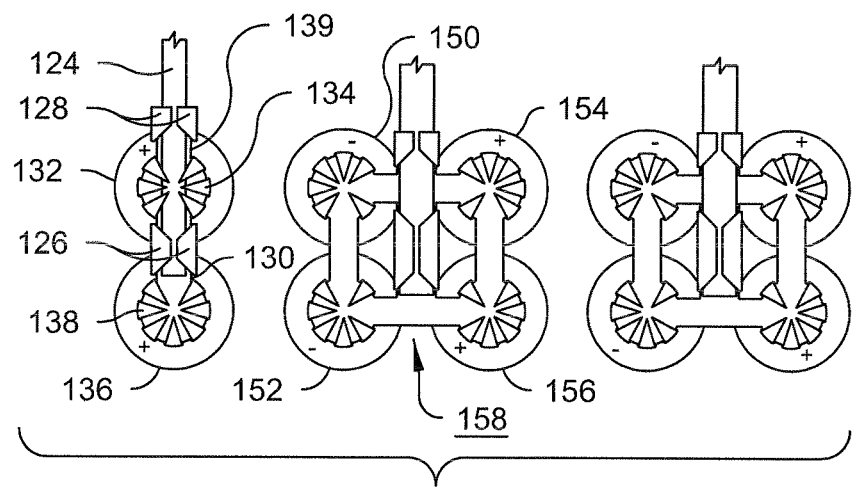
FIG. 21 is a top plan view of an array of cells in which pairs of cells are connected in sets of two parallel cells, and the sets are connected in series, in which the parallel and series connections are made using star-shaped grips and connecting strips which differ from the connecting strips used in the embodiments shown in FIGS. 7-20.
Figure 22:
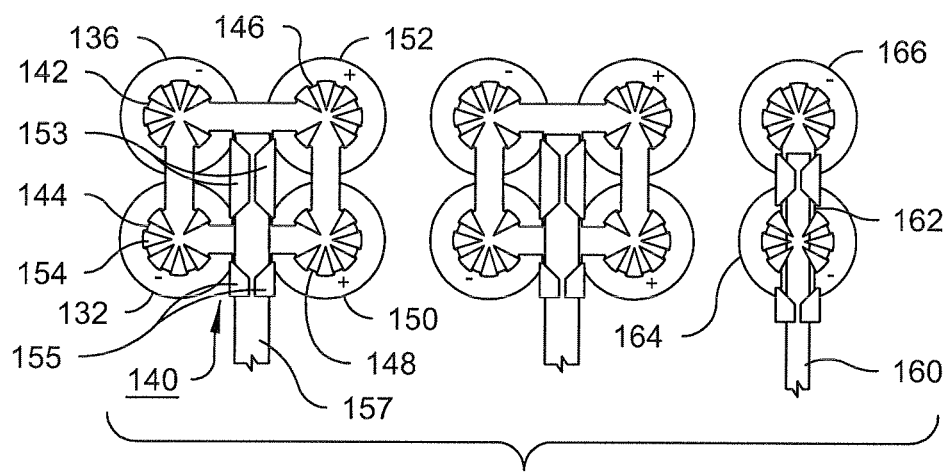
FIG. 22 is a bottom plan view of the array of cells shown in FIG. 21, showing the use of star-shaped grips and connecting strips to make parallel and series connections.

There are also cases in which a rechargeable battery incorporates a series-parallel arrangement, e.g., an arrangement in which units, each consisting of two cells in parallel, are connected in series. FIGS. 21 and 22 illustrate an example of such a rechargeable battery. In this case, the battery is an 18 volt battery composed of ten 3.6 volt lithium ion (Li ion) cells in parallel-connected pairs. Here, star-shaped grips are provided on both ends of each of the ten cells.

On the top side of the array of cells, as shown in FIG. 21, a connection to a positive battery terminal (not shown) is made through a metal strip 124, which can be the same metal conductor used to connect the original battery to the positive terminal, or a part of the original metal conductor. The strip 124 is clamped by first and second pairs of ears 126 and 128, which extend from side edges of a connecting strip 130, and are bent over strip 124. The connecting strip 130 comprises two discs which are clamped to positive terminals of cells 132 and 136 by a star shaped grips 134 and 138 similar to the star-shaped grips in the previously described embodiments. The ears 126 extend from the side edges of a part of the connecting strip which connects one disc to the other. Ears 128 extend from side edges of an extension 139 of the connecting strip.

On the bottom side of the array, as shown in FIG. 22, the negative terminals of cells 132 and 136 are connected together by a metal strip 140, which has four circular parts 142, 144, 146 and 148, connected respectively to the negative terminals of cells 136 and 132, and the positive terminals of cells 150 and 152. Each of the four circular parts of strip 126 is held by a star-shape grip, e.g., grip 154.

Ears 153 on a central part of strip 140, and ears 155 on an extension of strip 140, are bent over a metal strip 157 from the original battery. This metal strip can be used to tap a voltage less than the full 18 volts of which the battery is capable, for operation of control electronics or for switching a lower voltage to a load.

As shown in FIG. 21, the negative terminals of cells 150 and 152 are connected to the positive terminals of cells 154 and 156 by a similar four-cornered metal strip 158. Similar metals strips, each having four circular parts engageable by star-shaped grips, connect the cells in series/parallel relationship, and from one or more of the four-cornered strips, strips similar to strip 157 can be used to tap intermediate voltages. Intermediate voltages can also be tapped using discs connected to wires as in FIG. 7. If no intermediate voltages are required, the tapping connections can of course be eliminated.

At the negative end of the battery, the negative battery terminal (not shown) is connected to the negative terminals of cells 164 and 166 by a strip 160, which is clamped by two sets of ears on a connector 162.

The battery thus comprises five pairs of parallel-connected cells, the pairs being connected in series between a positive battery terminal connecting strip 124 and a negative battery terminal connecting strip 160.

The star-shaped grips can thus be used not only to connect cells in series as in the examples illustrated in FIGS. 7-20, but also to connect cells in a series/parallel arrangement as shown in FIGS. 21 and 22.

The preferred star-shaped grips have eight arms spaced uniformly about the periphery of their hubs. Such grips can be used in both in the series-connected embodiments of FIGS. 7-20 and in series/parallel-connected embodiments such as the one shown in FIGS. 21 and 22. For grips to be used only in the series-connected embodiments, the number of arms can be relatively small. A connecting strip attached to a six-armed grip can extend from the grip in any one of six directions sixty degrees apart from one another, by positioning the connecting strip so that it overlies one selected arm that is not bent over the part of the connecting strip held by the other arms. The same is true of a grip having from three to five arms. A grip having at least five arms is preferred as it provides a large area of contact with the connecting strip even if one of the arms is unbent, it allows for a relatively wide bridge, and it allows the bridge to be oriented at any desired angle from the cell terminal with only one arm of the grip unbent. The eight-armed grip of the preferred embodiment exhibits similar advantages.

A rebuilding kit according to the invention can include a set of replacement cells, either as individual cells with grips at both ends as in FIGS. 3 and 4, or as permanently connected pairs of cells as in FIGS. 5 and 6, preferably along with one or more solitary replacement cells, each having a star-shaped grip attached to both ends. The kit will also include connecting strips as in FIG. 2, and discs with leads soldered to them as in FIG. 7 for making connections to the battery terminals on the battery case. The rebuilding kit can include any of various kinds of rechargeable cells, including, but not limited to, NiMH (nickel-metal hydride) cells, Li ion (lithium ion) cells and NiCd (nickel-cadmium) cells. Fish paper for protection of the battery from short-circuiting may also be included.

Although star-shaped grips are preferred for most applications, in applications where sufficient space is available, many of the advantages of the invention can be realized in alternative embodiments in which grips welded to terminals of replacement cells and the connectors the extend from a grip on one cell to a grip on another cell utilize snap connectors of the kind described in U.S. Pat. No. 4,024,953 granted May 24, 1977. The disclosure of U.S. Pat. No. 4,024,953 is incorporated by reference.

What is claimed is:

1. A rebuilt rechargeable battery comprising:
   a battery case;
   a plurality of electrochemical cells within said battery case, each of said cells having a cylindrical shell, a positive terminal at one end of the shell, and a negative terminal at an opposite end of the shell, wherein at least two of said cells are electrically connected in series with each other by an electrical connection comprising first and second star-shaped grips and a conductive connector;
   in which each grip is composed of sheet metal and has a hub and a plurality of arms extending from the hub;
   in which the hub of the first grip is welded to the positive terminal of one of said two cells, and the hub of the second grip is welded to the negative terminal of the other of said two cells;
   in which said conductive connector has a first part engaged with the hub of the first grip and a second part engaged with the hub of the second grip;
   in which a plurality of arms of the first grip is bent so that a portion of each of said plurality of arms of the first grip is in opposed, spaced relationship to the hub of the first grip and said first part of the conductive connector is clamped between said portions of the bent arms of the first grip and the hub of the first grip and held by said portions of the bent arms of the first grip against the hub of the first grip, and a plurality of arms of the second grip is bent so that a portion of each of said plurality of arms of the second grip is in opposed, spaced relationship to the hub of the second grip and said second part of the conductive connector is clamped between said portions of the bent arms of the second grip and the hub of the second grip and held by said portions of the bent arms of the second grip against the hub of the second grip; and
   in which each said conductive connector is a unitary strip of sheet metal and includes an intermediate part connecting said first and second parts thereof, said intermediate part extending between two arms of the first grip and between two arms of the second grip.

2. A rebuilt rechargeable battery according to claim 1, in which said intermediate part is narrower than each of said first and second parts.

3. A rebuilt rechargeable battery according to claim 1, in which each of said first and second parts of the conductive connector is circular in shape.

4. A rebuilt rechargeable battery according to claim 1, in which each of said first and second parts of the conductive connector is circular in shape and has a diameter larger than the diameter of the grip hub against which it is clamped.

5. A rebuilt rechargeable battery according to claim 1, in which each of said first and second parts of the conductive connector is circular in shape, the bends of at least three arms of the first star-shaped grip bent over the first part contact the periphery of the first part at corners of a triangle within which the center of said first part is located, and the bends of at least three arms of the second star-shaped grip bent over the second part contact the periphery of the second part at corners of a triangle within which the center of said second part is located.

6. A rebuilt rechargeable battery according to claim 1, in which said cells consist of pairs of cells, in which the cells of each pair are in side-by-side relationship whereby each pair has terminals at a first end and terminals at a second end, and in which terminals at one end of each pair are directly welded to a conductive connector.

7. A rebuilt rechargeable battery according to claim 1, in which each of said star-shaped grips has at least five arms uniformly spaced around the hub thereof, and in which said intermediate part of each said conductive connector, connecting said first and second parts thereof, overlies at least one arm of each of the star-shaped grips to which the conductive connector is connected.

8. A rebuilt rechargeable battery comprising:
   a battery case;
   a plurality of electrochemical cells of substantially uniform size within said battery case, each of said cells having a cylindrical shell, a positive terminal at one end of the shell, and a negative terminal at an opposite end of the shell, and said cells being arranged in an array in which the cylindrical shell of each cell is in close proximity to the cylindrical shell of at least one other cell in the array, and in which a first set of ends composed of one end of each of the shells is disposed substantially in a first plane and the remaining ends of the shells are disposed substantially in a second plane parallel to the first plane and spaced from the first plane by a distance substantially equal to the length of each of the shells; and
   a plurality of electrical connections, each connection being from a terminal of one cell to a terminal of another cell and comprising first and second star-shaped grips, each composed of sheet metal and having a hub and a plurality of arms extending from the hub, the hub of the first grip being welded to said terminal of one cell, and the hub of the second grip being welded to said terminal of another cell, and a conductive connector connecting said first and second grips, the conductive connector having a first part engaged with the hub of the first grip and a second part engaged with the hub of the second grip;

wherein a plurality of arms of the first grip is bent so that a portion of each of said plurality of arms of the first grip is in opposed, spaced relationship to the hub of the first grip and said first part of the conductive connector is clamped between said portions of the bent arms of the first grip and the hub of the first grip and held by said portions of the bent arms of the first grip against the hub of the first grip, and a plurality of arms of the second grip is bent so that a portion of each of said plurality of arms of the second grip is in opposed, spaced relationship to the hub of the second grip and said second part of the conductive connector is clamped between said portions of the bent arms of the second grip and the hub of the second grip and held by said portions of the bent arms of the second grip against the hub of the second grip; and wherein each said conductive connector is a unitary strip of sheet metal and includes an intermediate part connecting said first and second parts thereof, said intermediate part extending between two arms of the first grip and between two arms of the second grip.

9. A rebuilt rechargeable battery according to claim 8, in which said intermediate part is narrower than each of said first and second parts in a direction parallel to said planes and perpendicular to its direction of elongation.

10. A rebuilt rechargeable battery according to claim 8, in which each of said first and second parts of each said conductive connector is circular in shape.

11. A rebuilt rechargeable battery according to claim 8, in which each of said first and second parts of each conductive connector is circular in shape and has a diameter larger than the diameter of the grip hub against which it is clamped.

12. A rebuilt rechargeable battery according to claim 8, in which each of said first and second parts of each conductive connector is circular in shape, the bends of at least three arms of the star-shaped grip bent over the first part contact the periphery of the first part at corners of a triangle within which the center of said first part is located, and the bends of at least three arms of the star-shaped grip contact the periphery of the second part at corners of a triangle within which the center of said second part is located.

13. A rebuilt rechargeable battery according to claim 8, in which said cells consist of pairs of cells, and in which both terminals at the ends of the shells of the cells of each pair disposed in said second plane are directly welded to a conductive strip.

14. A rebuilt rechargeable battery according to claim 8, in which each of said star-shaped grips has at least five arms uniformly spaced around the hub thereof, and in which said intermediate part of each said conductive connector, connecting said first and second parts thereof overlies at least one arm of each of the star-shaped grips to which the conductive connector is connected.

15. A rebuilt rechargeable battery comprising:
a battery case;
a plurality of electrochemical cells within said battery case, each of said cells having a cylindrical shell, a positive terminal at one end of the shell, and a negative terminal at an opposite end of the shell, wherein at least two of said cells are electrically connected with each other by an electrical connection comprising first and second star-shaped grips and a conductive connector;
in which each grip is composed of sheet metal and has a hub and a plurality of arms extending from the hub;
in which the hub of the first grip is welded to a terminal of one of said two cells, and the hub of the second grip is welded to a terminal of the other of said two cells;
in which said conductive connector has a first part engaged with the hub of the first grip and a second part engaged with the hub of the second grip;
in which a plurality of arms of the first grip is bent so that a portion of each of said plurality of arms of the first grip is in opposed, spaced relationship to the hub of the first grip and said first part of the conductive connector is clamped between said portions of the bent arms of the first grip and the hub of the first grip and held by said portions of the bent arms of the first grip against the hub of the first grip, and a plurality of arms of the second grip is bent so that a portion of each of said plurality of arms of the second grip is in opposed, spaced relationship to the hub of the second grip and said second part of the conductive connector is clamped between said portions of the bent arms of the second grip and the hub of the second grip and held by said portions of the bent arms of the second grip against the hub of the second grip; and
in which each said conductive connector is a unitary strip of sheet metal and includes an intermediate part connecting said first and second parts thereof, said intermediate part extending between two arms of the first grip and between two arms of the second grip.

16. A rebuilt rechargeable battery according to claim 15, in which said first part of the conductive connector is secured to the hub of the first grip solely by being clamped between portions of the bent arms of the first grip and the hub of the first grip, and said second part of the conductive connector is secured to the hub of the second grip solely by being clamped between portions of the bent arms of the second grip and the hub of the second grip.

\* \* \* \* \*